(12) United States Patent
Oh et al.

(10) Patent No.: US 11,444,287 B2
(45) Date of Patent: Sep. 13, 2022

(54) CATALYST COMPLEX FOR FUEL CELLS AND A METHOD FOR MANUFACTURING AN ELECTRODE INCLUDING THE SAME

(71) Applicants: HYUNDAI MOTOR COMPANY, Seoul (KR); KIA MOTORS CORPORATION, Seoul (KR)

(72) Inventors: Jongkil Oh, Yongin-si (KR); Bo Ki Hong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 3 days.

(21) Appl. No.: 17/039,037

(22) Filed: Sep. 30, 2020

(65) Prior Publication Data
US 2021/0135241 A1   May 6, 2021

(30) Foreign Application Priority Data

Oct. 31, 2019   (KR) .......................... 10-2019-0137069

(51) Int. Cl.
| | |
|---|---|
| *H01M 4/86* | (2006.01) |
| *H01M 8/0656* | (2016.01) |
| *H01M 4/88* | (2006.01) |
| *H01M 4/90* | (2006.01) |
| *H01M 4/92* | (2006.01) |

(52) U.S. Cl.
CPC ....... *H01M 4/8652* (2013.01); *H01M 4/8668* (2013.01); *H01M 4/8828* (2013.01); *H01M 4/9083* (2013.01); *H01M 4/926* (2013.01); *H01M 8/0656* (2013.01)

(58) Field of Classification Search
None
See application file for complete search history.

(56) References Cited

U.S. PATENT DOCUMENTS

| | | | |
|---|---|---|---|
| 8,148,026 B2 | 4/2012 | Oh | |
| 2004/0013935 A1 | 1/2004 | Ye | |
| 2007/0037042 A1 | 2/2007 | Ye | |

(Continued)

FOREIGN PATENT DOCUMENTS

| | | |
|---|---|---|
| JP | 2005533355 A | 11/2005 |
| KR | 20060086642 A | 8/2006 |

(Continued)

OTHER PUBLICATIONS

KR-2016081026-A English translation (Year: 2016).*

*Primary Examiner* — Lucas J. O'Donnell
(74) *Attorney, Agent, or Firm* — Lempia Summerfield Katz LLC

(57) ABSTRACT

A catalyst complex for fuel cells and a method for manufacturing an electrode including the same are disclosed. The catalyst complex for fuel cells, which is included in an electrode for fuel cells, includes a first catalyst configured to cause hydrogen oxidation reaction (HOR) and a second catalyst configured to cause water electrolysis reaction, i.e., oxygen evolution reaction (OER). The outer surface of the first catalyst is coated with a first ionomer binder, the outer surface of the second catalyst is coated with a second ionomer binder, and an equivalent weight (EW) of the second ionomer binder differs from an equivalent weight (EW) of the first ionomer binder.

20 Claims, 3 Drawing Sheets

(56) References Cited

U.S. PATENT DOCUMENTS

| | | | | |
|---|---|---|---|---|
| 2009/0023018 A1* | 1/2009 | Oh | ...................... | H01M 4/8828 |
| | | | | 429/494 |
| 2017/0062835 A1* | 3/2017 | Haug | .................. | H01M 4/8828 |
| 2020/0044271 A1 | 2/2020 | Kim | | |

FOREIGN PATENT DOCUMENTS

| KR | 20160059072 A | | 5/2016 | | |
|---|---|---|---|---|---|
| KR | 2016081026 A | * | 7/2016 | ............ | H01M 4/881 |
| KR | 20170069783 A | | 6/2017 | | |
| KR | 20180078162 A | | 7/2018 | | |

* cited by examiner

CATALYST COMPLEX FOR FUEL CELLS AND A METHOD FOR MANUFACTURING AN ELECTRODE INCLUDING THE SAME

CROSS-REFERENCE TO RELATED APPLICATION

This application claims under 35 U.S.C. § 119(a) the benefit of priority to Korean Patent Application No. 10-2019-0137069 filed on Oct. 31, 2019, the entire contents of which are incorporated herein by reference.

BACKGROUND

(a) Technical Field

The present disclosure relates to a catalyst complex for fuel cells and a method for manufacturing an electrode including the same.

(b) Background Art

Recently, a polymer electrolyte membrane fuel cell (PEMFC) is most commonly used as a fuel cell for vehicles. In order to normally produce high output performance of at least several tens of kW under various driving conditions of a vehicle, the polymer electrolyte membrane fuel cell must be stably operated within a wide current density range.

In order to satisfy a required output level of the fuel cell, the fuel cell is used in the form of a stack in which unit cells are stacked to be assembled. The unit cell is configured such that gas diffusion layers (GDLs) and gaskets are stacked at outer parts of a membrane-electrode assembly (MEA), at which a cathode and an anode are located. Bipolar plates (or separators) having flow fields to supply reaction gas (hydrogen used as fuel and oxygen or air used as an oxidizer) and to pass cooling water are provided outside the GDLs. Hundreds of these unit cells are stacked, and then, end plates to support the unit cells are coupled to the outermost unit cells.

In an electrochemical reaction in the fuel cell, as expressed in the following equation 1, after hydrogen supplied to an oxidation electrode, i.e., the anode, of the fuel cell is separated into protons and electrons by hydrogen oxidation reaction (HOR), the protons are moved to a reduction electrode, i.e., the cathode, through the membrane, and the electrons are moved to the cathode through an external circuit. The protons and electrons react with oxygen gas supplied from the outside in the cathode by oxygen reduction reaction (ORR) to produce electricity and heat, and simultaneously produce water as a by-product, as expressed in the following equation 2.

$H_2 \rightarrow 2H^+ + 2e^-, E° = 0.000$ V (vs. SHE)     [Equation 1]

$\frac{1}{2}O_2 + 2H^+ + 2e^- \rightarrow H_2O, E° = 1.229$ V (vs. SHE)     [Equation 2]

(Here, E° is a standard electrode potential, and SHE is a standard hydrogen electrode.)

Particularly, when the protons are moved from the anode to the cathode through the membrane, electro-osmotic drag (EOD) occurs in which hydronium ions are generally combined with water molecules so as to drag the water molecules. Further, when an amount of water accumulated at the cathode is increased, back diffusion (BD) may occur in which some amount of water is inversely moved from the cathode to the anode. When a proper amount of water, which is produced and moved through this fuel cell reaction, is present, the proper amount of water plays a desirable role, e.g., serves to maintain humidification of the membrane-electrode assembly, but when an excessive amount of water is present, if the excessive amount of water is not properly removed, water flooding occurs and the flood water serves to obstruct supply of reaction gases to the inside of the fuel cell and thus increases voltage loss. In addition to water flooding in the fuel cell, various other causes, such as ice formation in winter and abnormality of reaction gas supply devices, may cause shortage in supply of hydrogen and oxygen, i.e., the reaction gases used in the fuel cell, and particularly, it is known that hydrogen fuel starvation at the anode exerts a fatal negative influence on the performance of the fuel cell and greatly decreases cell voltage.

In general, shortage in supply of hydrogen may be divided into overall hydrogen starvation in which the overall fuel cell is in short supply of hydrogen, and local hydrogen starvation in which supply of hydrogen to the overall fuel cell is sufficient, but short supply of hydrogen occurs locally due to uneven distribution. These hydrogen starvations occur particularly under operating conditions, such as uneven supply and distribution of hydrogen gas, sudden increase in the load requirement of the fuel cell, or start-up of the fuel cell. Overall hydrogen starvation may be relatively easily detected by monitoring a hydrogen supply state or by using a sensor in a balance of plant (BOP), but local hydrogen starvation in some cells may be detected just by monitoring the respective cells of the fuel cell stack using a stack voltage monitoring apparatus. Thus, detecting local hydrogen starvation requires significant effort and a complicated control system.

When the anode lacks hydrogen gas during operation of the fuel cell, an anode voltage $E_{An}$ is increased so as to produce protons required by the fuel cell reaction, and is then increased to be greater than a cathode voltage $E_{Ca}$, and thus the fuel cell reaches a cell voltage reversal state in which a cell voltage $E_{Cell}$ is less than 0 V ($E_{cell} = E_{Ca} - E_{An} < 0$). Here, carbon serving as a catalyst support of the anode may react with water and thus be oxidized, as expressed in the following equations 3 and 4, but cannot supply sufficient amounts of protons and electrons necessary in the cathode due to a sluggish reaction rate, and consequently, the anode voltage is rapidly increased.

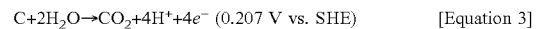

$C + 2H_2O \rightarrow CO_2 + 4H^+ + 4e^-$ (0.207 V vs. SHE)     [Equation 3]

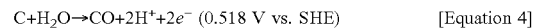

$C + H_2O \rightarrow CO + 2H^+ + 2e^-$ (0.518 V vs. SHE)     [Equation 4]

When the vehicle is continuously driven while ignoring the increase in the anode voltage, corrosion of carbon is accelerated, metal catalyst particles supported on the catalyst support are lost, and, thus, performance of the fuel cell may be lowered. When such a cell voltage reversal condition is continued, and thus, the fuel cell reaches an excessive voltage reversal state of −2 V or less, an excessive amount of heat is generated from the unit cells of the fuel cell and thus damages the membrane-electrode assembly and the gas diffusion layers, and particularly, serious problems, such as generation of pin-holes in the membrane-electrode assembly and electrical short of the cells, may be caused. Thereby, the fuel cell reaches a cell failure state in which the respective unit cells cannot be operated normally. Therefore, it is important to develop fuel cell components and a system which have excellent durability to reverse voltage.

Further, research on increase in corrosion resistance of a catalyst by supporting a compound for preventing corrosion of a catalyst support on the catalyst support is underway. However, since a main source to produce protons in an electrode is removed and thus protons cannot be produced, an anode voltage is further increased, and thereby, damage to cells may be more severe due to oxidation of a component located adjacent to a gas diffusion layer and increase in heat generation.

SUMMARY OF THE DISCLOSURE

The present disclosure has been made in an effort to solve the above-described problems associated with the prior art. It is an object of the present disclosure to provide a catalyst complex for fuel cells in which a water splitting catalyst is coated with a second ionomer binder having a lower equivalent weight (EW) than a first ionomer binder coated on a hydrogen oxidation reaction catalyst.

It is another object of the present disclosure to provide a catalyst complex for fuel cells in which ionomer binders having different equivalent weights are coated on a hydrogen oxidation reaction catalyst and a water splitting catalyst so as to increase corrosion resistance of the catalysts and to prevent excessive voltage rise.

It is yet another object of the present disclosure to provide a catalyst complex for fuel cells in which water may be smoothly supplied to a water splitting catalyst present in an electrode when voltage reversal occurs, so as to increase voltage reversal resistance of a fuel cell stack.

In one aspect, the present disclosure provides a catalyst complex for fuel cells, which may be included in an electrode for fuel cells. The catalyst complex for fuel cells includes a first catalyst configured to cause hydrogen oxidation reaction, and a second catalyst configured to cause water electrolysis reaction with the first catalyst. An outer surface of the first catalyst may be coated with a first ionomer binder and an outer surface of the second catalyst may be coated with a second ionomer binder, and an equivalent weight (EW) of the second ionomer binder differs from an equivalent weight (EW) of the first ionomer binder.

In an embodiment, the equivalent weight (EW) of the second ionomer binder may be 92% or less of the equivalent weight (EW) of the first ionomer binder.

In another embodiment, the equivalent weight (EW) of the first ionomer binder may be 700 to 1200.

In still another embodiment, the first catalyst may include a supported-type catalyst in which catalyst particles are supported on a carbon support, and the carbon support may include one selected from a group consisting of, or including, carbon black (CB), carbon nanotubes (CNTs), carbon nanofibers (CNFs), carbon nanowires (CNWs), carbon nanohorns (CNHs), graphene, and combinations thereof.

In yet another embodiment, the first catalyst may include a metal catalyst and the metal catalyst may include one selected from a group consisting of, or including, platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), yttrium (Y), and combinations thereof. The second catalyst may include at least one of metal nanoparticles or a metal oxide. The metal may include one selected from a group consisting of, or including, ruthenium (Ru), iridium (Ir), chromium (Cr), manganese (Mn), iron (Fe), cobalt (Co), nickel (Ni), copper (Cu), molybdenum (Mo), yttrium (Y), and combinations thereof.

In still yet another embodiment, the second catalyst may include a supported-type catalyst in which catalyst particles are supported on a support.

In a further embodiment, the support may include one selected from a group consisting of, or including, carbon black, carbon nanotubes, carbon nanofibers, carbon nanowires, carbon nanohorns, graphene, titanium oxide, cerium oxide, niobium oxide, tungsten oxide, titanium carbide, titanium nitride, and combinations thereof.

In another further embodiment, a content of the second catalyst may be 2 wt % to 80 wt % with respect to a weight of the first catalyst.

In another aspect, the present disclosure provides a method for manufacturing an electrode for fuel cells including a catalyst complex. The method includes preparing a first coated catalyst by coating a first catalyst with a first ionomer binder, preparing a second coated catalyst by coating a second catalyst with a second ionomer binder having an equivalent weight (EW) which may be 92% or less of an equivalent weight (EW) of the first ionomer binder, preparing a catalyst ink by mixing the first coated catalyst, the second coated catalyst and, a solvent, and manufacturing the electrode using the catalyst ink.

In an embodiment, in the preparing the catalyst ink, the solvent may include at least one of alcohol or deionized water. The alcohol may include one selected from a group consisting of, or including, including isopropyl alcohol (IPA), n-propyl alcohol (nPA), ethyl alcohol, and combinations thereof.

In another embodiment, the second catalyst in the catalyst ink may have a content of 2 wt % to 80 wt % with respect to a weight of the first catalyst.

In still another embodiment, the preparing the first coated catalyst may include preparing a first mixed solution including the first catalyst, the first ionomer binder, and a first solvent, and performing drying and heat treatment of the first mixed solution.

In yet another embodiment, the first ionomer binder in the first mixed solution may have a content of 10 wt % to 50 wt % with respect to a total weight of the first catalyst and the first ionomer binder.

In still yet another embodiment, in the performing the heat treatment of the first mixed solution, the heat treatment may be performed within a range of an α-transition temperature of the first ionomer binder to a temperature higher than the α-transition temperature by 100° C.

In a further embodiment, in the performing the heat treatment of the first mixed solution, the heat treatment may be performed for 10 minutes to 10 hours.

In another further embodiment, the preparing the second coated catalyst may include preparing a second mixed solution including the second catalyst, the second ionomer binder, and a second solvent, and performing drying and heat treatment of the second mixed solution.

In still another further embodiment, the second ionomer binder in the second mixed solution may have a content of 5 wt % to 40 wt % with respect to a total weight of the second catalyst and the second ionomer binder.

In yet another further embodiment, in the performing the heat treatment of the second mixed solution, the heat treatment may be performed within a range of an α-transition temperature of the second ionomer binder to a temperature higher than the α-transition temperature by 100° C.

In still yet another further embodiment, in the performing the heat treatment of the second mixed solution, the heat treatment may be performed for 10 minutes to 10 hours.

In yet another aspect, the present disclosure provides a method for manufacturing an electrode for fuel cells including a catalyst complex. The method includes preparing a first mixed solution including a first catalyst, a first ionomer binder, and a first solvent, preparing a second mixed solution including a second catalyst, a second ionomer binder, and a second solvent, preparing a second coated catalyst by performing drying and heat treatment of the second mixed solution, preparing a catalyst ink by mixing the first mixed solution and the second coated catalyst, and manufacturing the electrode using the catalyst ink.

Other aspects and embodiments of the disclosure are discussed below.

The above and other features of the disclosure are also discussed below.

BRIEF DESCRIPTION OF THE DRAWINGS

The above and other features of the present disclosure are described in detail with reference to certain embodiments thereof illustrated in the accompanying drawings which are given hereinbelow by way of illustration only, and thus are not limitative of the present disclosure, and wherein.

Figure 1:
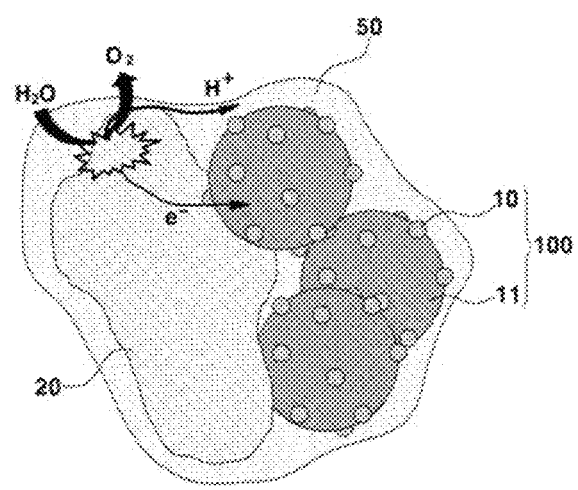
FIG. 1 is a schematic diagram of a conventional catalyst complex for fuel cells.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter reference is made in detail to various embodiments of the present disclosure, examples of which are illustrated in the accompanying drawings and described below. While the disclosure is described in conjunction with specific embodiments, it should be understood that the present description is not intended to limit the disclosure to the disclosed embodiments. On the contrary, the disclosure is intended to cover not only the embodiments, but also various alternatives, modifications, equivalents and other embodiments within the spirit and scope of the disclosure as defined by the appended claims. In the following description of the embodiments, the same elements are denoted by the same reference numerals even though they are depicted in different drawings.

All terms (including technical and scientific terms) used in the following description of the embodiments may have meanings which should be commonly understood by those having ordinary skill in the art to which the present disclosure pertains, unless defined otherwise. Also, it should be interpreted that terms defined in generally used dictionaries have meanings coinciding with contextual meanings in the related art, and do not have ideal or excessively formal meanings unless specially defined.

Further, terms used in the following description of the embodiments serve to describe the embodiments and do not limit the present disclosure. In the following description of the embodiments, singular expressions may encompass plural expressions, unless they have clearly different contextual meanings. In the following description of the embodiments, terms, such as "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, terms, such as "and/or" may conceptually include each of stated items and all combinations of one or more of the stated items.

In addition, it should be understood that, when a part, such as a layer, a film, a region or a plate, is said to be "on" another part, the part may be located "directly on" the other part or other parts may be interposed between both parts. In the same manner, it should be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected. Thus, it should be understood that they are modified by the term "about", unless stated otherwise. In addition, it should be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it should be understood that, when the range of a variable is stated, the variable includes all values within the stated range including stated end points of the range. For example, it should be understood that a range of "5 to 10" includes not only values of 5, 6, 7, 8, 9 and 10 but also arbitrary subranges, such as a subrange of 6 to 10, a subrange of 7 to 10, a subrange of 6 to 9, a subrange of 7 to 9, etc., and arbitrary values between integers which are valid within the scope of the stated range, such as 5.5, 6.5, 7.5, 5.5 to 8.5, 6.5 to 9, etc. Further, for example, it should be understood that a range of "10% to 30%" includes not only all integers including values of 10%, 11%, 12%, 13%, . . . 30% but also arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Hereinafter, the embodiments of the present disclosure are described in detail with reference to the accompanying drawings.

FIG. 1 is a schematic diagram of a conventional catalyst complex for fuel cells.

Referring to FIG. 1, the conventional catalyst complex for fuel cells may be included in an electrode (for example, an anode) of a membrane-electrode assembly (MEA) for fuel cells, An electrochemical reaction for generating electricity of a fuel cell may occur in a membrane-electrode assembly (MEA) including a perfluorinated sulfonic acid (PFSA) ionomer-based electrolyte membrane and electrodes (an anode and a cathode). An electrode used in a fuel cell electric vehicle may include a catalyst complex including catalysts, which cause fuel cell reaction or are supported on catalyst supports, and may include an ionomer binder, which binds the catalysts to each other or binds the catalysts and the catalyst supports to each other.

In more detail, as shown in FIG. 1, the catalyst complex included in the electrode may include a supported-type hydrogen oxidation reaction catalyst 100 including a hydrogen oxidation reaction catalyst 10 and a carbon support 11 on which the hydrogen oxidation reaction catalyst 10 may be supported, a water splitting catalyst 20, and an ionomer binder 50 which may be coated on the supported-type hydrogen oxidation reaction catalyst 100, and the water splitting catalyst 20.

As the hydrogen oxidation reaction catalyst 10, high-priced platinum (Pt) may be used and may be alloyed with a metallic element, such as palladium (Pd), ruthenium (Ru), iridium (Ir), gold (Au), manganese (Mn), iron (Fe), cobalt (Co), nickel (Ni), copper (Cu), yttrium (Y) or the like, for the purpose of price reduction of a fuel cell stack, mitigation of catalyst poisoning (e.g. by carbon monoxide), or for improvement in performance of the catalyst. In order to increase a reaction area of this metal catalyst, nanoscale particles of the metal catalyst may be supported on a catalyst support having a large specific surface area. As a support for fuel cell catalysts, a carbon-based material having a high electrical conductivity may be used, such as carbon black, activated carbon, carbon nanotubes, carbon nanofibers, carbon nanospheres, carbon nanowires, graphite, graphene, mesoporous carbon, or the like. Further, as the ionomer binder 50 of the electrode, a perfluorinated sulfonic acid (PFSA)-based ionomer binder may be used.

In order to prevent corrosion of a catalyst, the catalyst may be supported on a non-carbon support, such as titanium oxide, cerium oxide, niobium oxide, tungsten oxide, titanium carbide, titanium nitride, or the like, and thus, corrosion resistance of the catalyst may be increased.

Therefore, the water splitting catalyst 20 employed by the electrodes splits water, as expressed in following equation 5, when voltage reversal occurs, and supplies protons to prevent excessive voltage rise of the electrode and to suppress oxidation of a carbon support, thereby being capable of preventing cell damage.

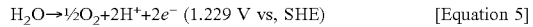

$$H_2O \rightarrow \tfrac{1}{2}O_2 + 2H^+ + 2e^- \quad (1.229 \text{ V vs, SHE}) \quad \text{[Equation 5]}$$

Since, when water present in the electrode or water supplied through humidified gas from the outside may not be properly supplied to the water splitting catalyst 20 under a voltage reversal condition, carbon oxidation reaction may be rapidly increased so as to supply a shortage of protons, and it may be necessary to effectively supply water, i.e., a reactant, to the water splitting catalyst 20.

Figure 2:
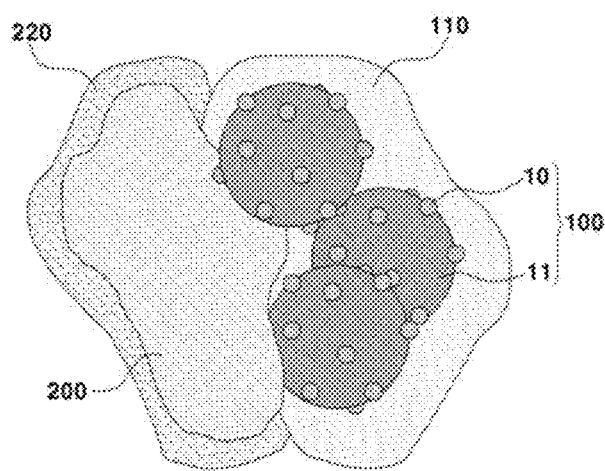
FIG. 2 is a schematic diagram of a catalyst complex for fuel cells in accordance with one embodiment of the present disclosure.

FIG. 2 is a schematic diagram of a catalyst complex for fuel cells in accordance with one embodiment of the present disclosure.

Referring to FIG. 2, the catalyst complex for fuel cells in accordance with one embodiment of the present disclosure may include a first catalyst 100 which may cause hydrogen oxidation reaction (HOR), and a second catalyst 200 which may cause water electrolysis reaction, i.e., oxygen evolution reaction (GER), with the first catalyst 100. Further, the outer surface of the first catalyst 100 may be coated with a first ionomer binder 110, and the outer surface of the second catalyst 200 may be coated with a second ionomer binder 220. In some cases, the equivalent weight (EW) of the second ionomer binder 220 may be lower than the equivalent weight (EW) of the first ionomer binder 110.

As shown in FIG. 2, the first catalyst (i.e., a hydrogen oxidation reaction catalyst) 100 may include a supported-type catalyst in which catalyst particles 10 are supported on a carbon support 11. The carbon support 11 may be one selected from a group consisting of, or including, carbon black (CB), carbon nanotubes (CNTs), carbon nanofibers (CNFs), carbon nanowires (CNWs), carbon nanohorns (CNHs), graphene, and combinations thereof. Thereby, the carbon particles 10 may be supported on the carbon support 11.

Further, the first catalyst 100 may include, for example, a metal catalyst. For example, as shown in FIG. 2, the catalyst particles 10 of the first catalyst 100 may be particles of a metal catalyst. The metal catalyst may be, for example, one selected from a group consisting of, or including, platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), yttrium (Y), and combinations thereof.

Further the second catalyst 200 may include, for example, at least one of metal nanoparticles or a metal oxide. This metal of the second catalyst 200 may be one selected from a group consisting of, or including, ruthenium (Ru), iridium (Ir), chromium (Cr), manganese (Mn), iron (Fe), cobalt (Co), nickel (Ni), copper (Cu), molybdenum (Mo), yttrium (Y), and combinations thereof.

Further, the second catalyst 200 may include, for example, a supported-type catalyst in which catalyst particles are supported on a support. Therefore, the reaction area of the second catalyst 200 may be further increased. The support may be, for example, one selected from a group consisting of, or including, carbon black, carbon nanotubes, carbon nanofibers, carbon nanowires, carbon nanohorns, graphene, titanium oxide, cerium oxide, niobium oxide, tungsten oxide, titanium carbide, titanium nitride, and combinations thereof.

Further, the catalyst complex for fuel cells may include 2 wt % to 80 wt % of the second catalyst 200 with respect to the weight of the first catalyst 100, i.e., the hydrogen oxidation reaction catalyst. If the content of the second catalyst 200 is less than 2% of the weight of the first catalyst 100, a proton supply capacity may be low when voltage reversal occurs, and thus, it may be difficult to suppress rise in the voltage of the electrode (i.e., the anode). On the other hand, if the content of the second catalyst 200 exceeds 80% of the weight of the first catalyst 100, supply of hydrogen gas, which may be a reactant of the hydrogen oxidation reaction, may be obstructed under normal operating conditions of the fuel cell in which voltage reversal does not occur, and thereby, performance of the fuel cell may be lowered and thus the material cost may be increased due to use of an excessive amount of the second catalyst 200.

As shown in FIG. 2, the first ionomer binder 110 may be coated on the first catalyst 100, which may be a supported-type hydrogen oxidation reaction catalyst including the catalyst particles 10 and the carbon support 11 and may thus bind components of the first catalyst 100 and transmit protons, i.e., a reaction product. The first ionomer binder 110 may be one selected from a group consisting of, or including, a perfluorinated sulfonic acid (PFSA)-based ionomer, a hydrocarbon-based ionomer, and a combination thereof. In one example, the first ionomer binder 110 may be a x. PFSA-based ionomer.

Further, as shown in FIG. 2, the second ionomer binder 220 may be coated on the second catalyst 200 and may thus serve to bind the second catalyst 200, to supply water to the second catalyst 200 and to transmit protons, i.e., the reaction product. The second ionomer 220 may be one selected from a group consisting of, or including, a perfluorinated sulfonic acid (PFSA)-based ionomer, a hydrocarbon-based ionomer, and a combination thereof. In one example, the second ionomer 220 may be a PFSA-based ionomer.

The catalyst complex for fuel cells in accordance with one example of the present disclosure differs from the conventional catalyst complex in that the equivalent weight (EW) of the second ionomer binder 220 may be lower than the equivalent weight (EW) of the first ionomer binder 110. For example, the equivalent weight (EW) of the second ionomer binder 220 may be 92% or less of the equivalent weight (EW) of the first ionomer binder 110. That is, the equivalent weight (EW) of the second ionomer binder 220 may lower than the equivalent weight (EW) of the first ionomer binder 110 by 8% or more. Thereby, when voltage reversal of the fuel cell occurs, water may be smoothly supplied to the second catalyst 200 present in the electrode (e.g., the anode), and consequently, voltage reversal resistance of the fuel cell stack may be increased. If the equivalent weight (EW) of the second ionomer binder 220 may be greater than the equivalent weight (EW) of the first ionomer binder 110 or be lower than the equivalent weight (EW) of the first ionomer binder 110 by less than 8%, when voltage reversal occurs, water corresponding to the reactant may not be sufficiently supplied to the second catalyst 200, and thus, it may be difficult to suppress rise in the voltage of the electrode (i.e., the anode) for a long period of time.

The equivalent weight (EW) of the first ionomer binder 110 may be 700 to 1200. Here, the equivalent weight (EW) may mean the dry weight of an ionomer per mol of a sulfonic acid group included in an ionomer binder. When the equivalent weight (EW) of the first ionomer binder 110 is less than 700, mechanical stiffness of the first ionomer binder 110 may be lowered, the content of water in the first ionomer binder 110 may be excessively increased, and thus, water flooding in the electrode may occur during operation of the fuel cell. On the other hand, when the equivalent weight (EW) of the first ionomer binder 110 exceeds 1200, proton conductivity may be lowered, and thus, performance of the fuel cell may be degraded. In some cases, the equivalent weight (EW) of the first ionomer binder 110 may be 725 to 1100.

Hereinafter, methods for manufacturing an electrode including a catalyst complex for fuel cells in accordance with several embodiments of the present disclosure are described. For convenience of description, a detailed description of a part of the construction and operation of one embodiment, which are substantially the same as those described above with reference to FIGS. 1 and 2 have been omitted.

Figure 3:
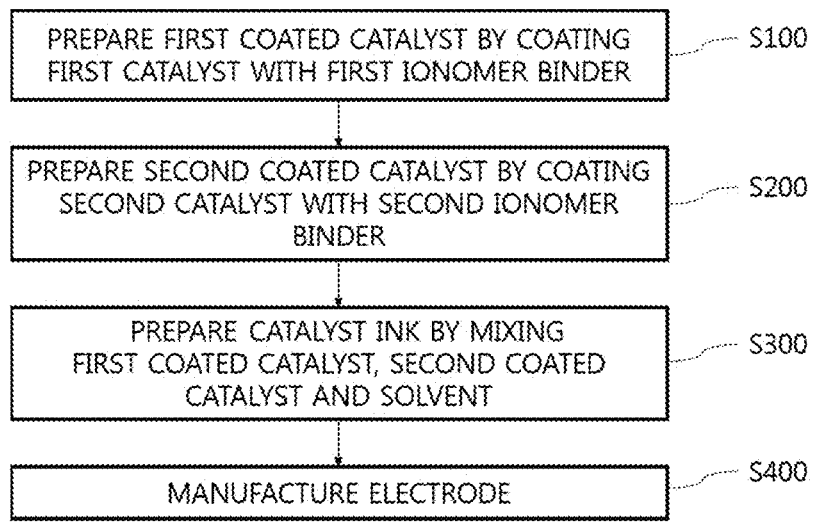
FIG. 3 is a flowchart schematically representing a method for manufacturing an electrode including a catalyst complex for fuel cells in accordance with one embodiment of the present disclosure.

First, referring to FIG. 3, a method for manufacturing an electrode for fuel cells including a catalyst complex in accordance with one embodiment of the present disclosure may include preparing a first coated catalyst by coating a first catalyst with a first ionomer binder (operation S100), preparing a second coated catalyst by coating a second catalyst with a second ionomer binder having an equivalent weight (EW) which may be 92% or less of the equivalent weight (EW) of the first ionomer binder 110 (operation S200), preparing a catalyst ink by mixing the first coated catalyst, the second coated catalyst, and a solvent (operation S300), and manufacturing the electrode using the catalyst ink (operation S400).

In preparation of the first coated catalyst (operation S100), for example, the first catalyst including particles of a hydrogen oxidation reaction catalyst and a carbon support, which supports the catalyst particles, may be coated with the first ionomer binder. As described above, in the present disclosure, the first catalyst may be the hydrogen oxidation reaction catalyst. Further, in preparation of the second coated catalyst (operation S200), for example, the second catalyst corresponding to a water splitting catalyst may be coated with the second ionomer binder. Although FIG. 3 illustrates the catalyst ink as being prepared (operation S300) by preparing the second coated catalyst (operation S200) after preparing the first coated catalyst (operation S100), the present disclosure is not limited thereto. That is, the catalyst ink may be prepared (operation S300) by simultaneously performing preparation of the first coated catalyst (operation S100) and preparation of the second coated catalyst (operation S200), or by preparing the first coated catalyst (operation S100) after preparing the second coated catalyst (operation S200).

In some cases, in preparation of the catalyst ink (operation S300), the solvent may include, for example, at least one of alcohol or deionized water. The alcohol may be one selected from a group consisting of, or including, isopropyl alcohol (IPA), n-propyl alcohol (nPA), ethyl alcohol, and combinations thereof. Thus, in preparation of the catalyst ink (operation S300), the catalyst ink (e.g., anode) may be prepared by mixing the first catalyst (i.e., the hydrogen oxidation reaction catalyst) coated with the first ionomer binder, the second catalyst (i.e., the water splitting catalyst) coated with the second ionomer binder, and the solvent.

Further, as described above, in preparation of the catalyst ink (operation S300), the prepared catalyst ink may include 2 wt % to 80 wt % of the second coated catalyst with respect to the weight of the first coated catalyst.

In manufacture of the electrode (e.g., the anode) (operation S400), the electrode may be manufactured using various methods, for example, a decal transfer process, a spray process, or an inkjet-printing process.

For example, if the decal transfer process is used to manufacture the electrode (operation S400), a decal electrode may be manufactured by coating the catalyst ink on a decal transfer film using a bar coater and sufficiently drying the decal transfer film coated with the catalyst ink. In the manufactured decal electrode, the load of a metal catalyst (e.g., platinum (Pt)) included therein may be adjusted by controlling the content or coating thickness of the catalyst ink. Further, since, when the decal electrode coated on the decal transfer film is transferred to an electrolyte membrane, the decal transfer film should be easily separated from the electrolyte membrane and sufficiently endure high-temperature heat treatment conditions, the decal transfer film may use a heat-resistant polymer. The heat-resistant polymer may include, for example, one or more selected from a group consisting of, or including, polytetrafluoroethylene (PTFE), poly (ethylene terephthalate) (PET), poly (butylene terephthalate) (PBT), poly (trimethylene terephthalate) (PTT), poly (ethylene naphthalate) (PEN), and polyimide (PI). Thereafter, the decal electrode may be thermo-compressed onto the electrolyte membrane, and then the decal transfer film may be removed, thereby manufacturing a membrane-electrode assembly for fuel cells.

Next, referring to FIG. 4, a method for manufacturing an electrode for fuel cells including a catalyst complex in accordance with another embodiment of the present disclosure will be described. For convenience of description, a detailed description of a part of the construction and operation of this embodiment, which are substantially the same as those described above with reference to FIGS. 1-3 have been omitted.

In the method for manufacturing an electrode for fuel cells in accordance with this embodiment of the present disclosure, for example, preparation of a first coated catalyst (referring to operation S100 of FIG. 3) may include preparing a first mixed solution including a first catalyst, a first ionomer binder, and a first solvent (operation S101), and may include preparing the first coated catalyst by performing drying and heat treatment of the first mixed solution (operation S110).

In preparation of the first mixed solution (operation S101), for example, the first mixed solution may be prepared by putting the first catalyst 100, i.e., a hydrogen oxidation reaction catalyst, and the first ionomer binder into the first solvent, sufficiently agitating an acquired mixture at room temperature using an agitator, and then performing ultrasonication of the mixture.

In some cases, in preparation of the first mixed solution (operation S101), the first mixed solution may include, for example, 10 wt % to 50 wt % of the first ionomer binder with respect to the total weight of the first catalyst (i.e., the hydrogen oxidation reaction catalyst) and the first ionomer binder. When the content of the first ionomer binder is less than 10 wt % with respect to the total weight, it may be difficult to sufficiently connect and bind the first catalyst (including the hydrogen oxidation reaction catalyst) into a three-dimensional network structure. On the other hand, when the content of the first ionomer binder exceeds 50 wt % with respect to the total weight, an excessive amount of the first ionomer binder may close pores in the electrode and water flooding in the electrode may occur. In some cases, 20 wt % to 35 wt % of the first ionomer binder with respect to the total weight of the first catalyst and the first ionomer binder may be used.

Further, the first solvent may include at least one of alcohol or deionized water, and the alcohol may be one selected from a group consisting of, or including, isopropyl alcohol (IPA), n-propyl alcohol (nPA), ethyl alcohol, and combinations thereof.

In preparation of the first coated catalyst by performing drying and heat treatment of the first mixed solution (operation S110), the first solvent may be removed by drying the prepared first mixed solution, and then the entire surface of the first catalyst may be coated with the first ionomer binder by performing heat treatment of the acquired cake-type first catalyst (i.e., the hydrogen oxidation reaction catalyst) and first ionomer binder within a dryer.

In preparation of the first coated catalyst by performing drying and heat treatment of the first mixed solution (operation S110), for example, the heat treatment may be performed within a range of the α-transition temperature $T_\alpha$ of the first ionomer binder to a temperature which is higher than the α-transition temperature $T_\alpha$ by 100° C. Here, the α-transition temperature $T_\alpha$ may mean a temperature at which crystallinity of a polymer is suddenly changed. When the temperature of the heat is treatment (in operation S110) is less than the α-transition temperature $T_\alpha$ of the first ionomer binder, binding force between the first catalyst (i.e., the hydrogen oxidation reaction catalyst) and the first ionomer binder may be low. Thus, the first catalyst and the first ionomer binder may be separated from each other when they are redistributed to the solvent. On the other hand, when the temperature of the heat treatment (in operation S110) exceeds the temperature higher than the α-transition temperature $T_\alpha$ by 100 thermal degradation of the first ionomer binder may be accelerated or a degree of crystallinity of the first ionomer binder may be excessively increased. Thus, the first ionomer binder may not be redistributed to the solvent due to decrease in solubility. Further, when the membrane-electrode assembly is manufactured thereafter, interfacial adhesion between the electrode and the electrolyte membrane may be lowered. In some cases, the temperature of the heat treatment (in operation S110) may be within a range of the α-transition temperature $T_\alpha$ of the first ionomer binder to a temperature higher than the α-transition temperature $T_\alpha$ by 50° C. The α-transition temperature $T_\alpha$ of the first ionomer binder may be, for example, 60° C. to 130° C., without being limited thereto. In other words, the α-transition temperature $T_\alpha$ of the first ionomer binder may be varied according to the kind and structure of the ionomer.

Further, the heat treatment (in operation S110) may be performed, for example, for 10 minutes to 10 hours. In other words, the heat treatment of the first catalyst (i.e., the hydrogen oxidation reaction catalyst) and the first ionomer binder may be performed for 10 minutes to 10 hours. In some cases, the heat treatment of the first catalyst (i.e., the hydrogen oxidation reaction catalyst) and the first ionomer binder (in operation S110) may be performed, for example, within the range of the α-transition temperature $T_\alpha$ of the first ionomer binder to the temperature higher than the α-transition temperature $T_\alpha$ by 100° C.; for 10 minutes to 10 hours. When the heat treatment time is less than 10 minutes, effects of the heat treatment may be insignificant, and when the heat treatment time exceeds 10 hours, thermal degradation of the first ionomer binder may be accelerated or the degree of crystallinity of the first ionomer binder may be excessively increased. Thereby, a process cycle time may be increased. In some cases, such heat treatment of the first mixed solution (in operation S110) may be performed for 30 minutes to 5 hours.

Figure 4:
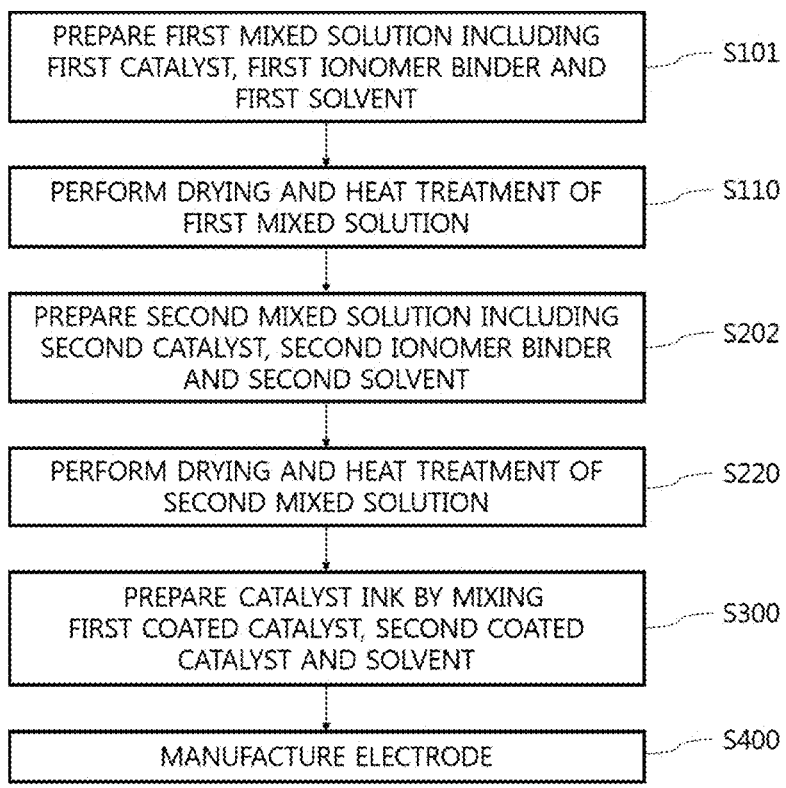
FIG. 4 is a flowchart schematically representing a method for manufacturing an electrode including a catalyst complex for fuel cells in accordance with another embodiment of the present disclosure.

As shown in FIG. 4, preparation of a second coated catalyst (referring to operation S200 of FIG. 3) may include preparing a second mixed solution including a second catalyst, a second ionomer binder, and a second solvent (operation S202), and preparing the second coated catalyst by performing drying and heat treatment of the second mixed solution (operation S220).

In preparation of the second mixed solution (operation S202), for example, the second mixed solution may be prepared by putting the second catalyst (i.e., a water splitting catalyst) and the second ionomer binder into the second solvent, sufficiently agitating an acquired mixture at room temperature using an agitator, and then performing ultrasonication of the mixture.

In preparation of the second mixed solution (operation S202), the second mixed solution may include, for example, 5 wt % to 40 wt % of the second ionomer binder with respect to the total weight of the second catalyst and the second ionomer binder. When the content of the second ionomer binder is less than 5 wt % with respect to the total weight, the second ionomer binder may not sufficiently surround the second catalyst (i.e., the water splitting catalyst), water corresponding to a reactant may not be smoothly supplied to the second catalyst when voltage reversal occurs, and thus, it may be difficult to improve voltage reversal resistance of the fuel cell stack. On the other hand, when the content of the second ionomer binder exceeds 40 wt % with respect to the total weight, water corresponding to the reactant may be smoothly supplied to the second catalyst (i.e., the water splitting catalyst) when voltage reversal occurs, but an excessive amount of the second ionomer binder may close the pores in the electrode, and water flooding in the electrode may occur under normal operating conditions of the fuel cell in which voltage reversal does not occur. In some cases, 15 wt % to 30 wt % of the second ionomer binder with respect to the total weight of the second catalyst and the second ionomer binder may be used.

Further, the second solvent may be one selected from, for example, a group consisting of, or including, isopropyl alcohol (IPA), n-propyl alcohol (nPA), ethyl is alcohol, and combinations thereof.

In preparation of the second coated catalyst by performing drying and heat treatment of the second mixed solution (operation S220), the second solvent may be removed by drying the prepared second mixed solution. Then the entire surface of the second catalyst may be coated with the second ionomer binder by performing heat treatment of the acquired cake-type second catalyst (for example, including the water splitting catalyst) and second ionomer binder within a dryer.

In preparation of the second coated catalyst by performing drying and heat treatment of the second mixed solution (operation S220), for example, the heat treatment may be performed within a range of the $\alpha$-transition temperature $T_\alpha$ of the second ionomer binder to a temperature which is higher than the $\alpha$-transition temperature $T_\alpha$ by 100° C.

When the temperature of the heat treatment (in operation S220) is less than the $\alpha$-transition temperature $T_\alpha$ of the second ionomer binder, binding force between the second catalyst (including the water splitting catalyst) and the second ionomer binder may be low, and thus, the second catalyst and the second ionomer binder may be separated from each other when they are redistributed to the solvent. On the other hand, when the temperature of the heat treatment (in operation S220) exceeds the temperature higher than the $\alpha$-transition temperature $T_\alpha$ by 100° C., thermal degradation of the second ionomer binder may be accelerated or a degree of crystallinity of the second ionomer binder may be excessively increased, and thus, the second ionomer binder ay not be redistributed to the solvent due to decrease in solubility. Further, when the membrane-electrode assembly is manufactured thereafter, interfacial adhesion between the electrode and the electrolyte membrane may be lowered. In some cases, the temperature of the heat treatment (in operation S220) may be within a range of the $\alpha$-transition temperature $T_\alpha$ of the second ionomer binder to a temperature higher than the $\alpha$-transition temperature $T_\alpha$ by 50° C. The $\alpha$-transition temperature $T_\alpha$ of the second ionomer binder may be, for example, 60° C. to 130° C., without being limited thereto. That is, the $\alpha$-transition temperature $T_\alpha$ of the second ionomer binder may be varied according to the kind and structure of the ionomer.

Further, the heat treatment (in operation S220) may be performed, for example, for 10 minutes to 10 hours. That is, the heat treatment of the second catalyst (including the water splitting catalyst) and the second ionomer binder may be performed for 10 minutes to 10 hours. In some cases, the heat treatment of the second catalyst (including the water splitting catalyst) and the second ionomer binder (in operation S220) may be performed, for example, within the range of the $\alpha$-transition temperature $T_\alpha$ of the second ionomer binder to the temperature higher than to the $\alpha$-transition temperature $T_\alpha$ by 100° C. for 10 minutes to 10 hours. When the heat treatment time is less than 10 minutes, effects of the heat treatment may be insignificant, and when the heat treatment time exceeds 10 hours, thermal degradation of the second ionomer binder may be accelerated or the degree of crystallinity of the second ionomer binder may be excessively increased. Thereby, a process cycle time may be increased. Such heat treatment of the second mixed solution (in operation S220) may be performed for 30 minutes to 5 hours.

Next, referring to FIG. 5, a method for manufacturing an electrode for fuel cells including a catalyst complex in accordance with yet another embodiment of the present disclosure will be described. For convenience of description, a detailed description of a part of the construction and operation of this embodiment, which are substantially the same as those described above with reference to FIGS. 1-4 have been omitted.

Figure 5:
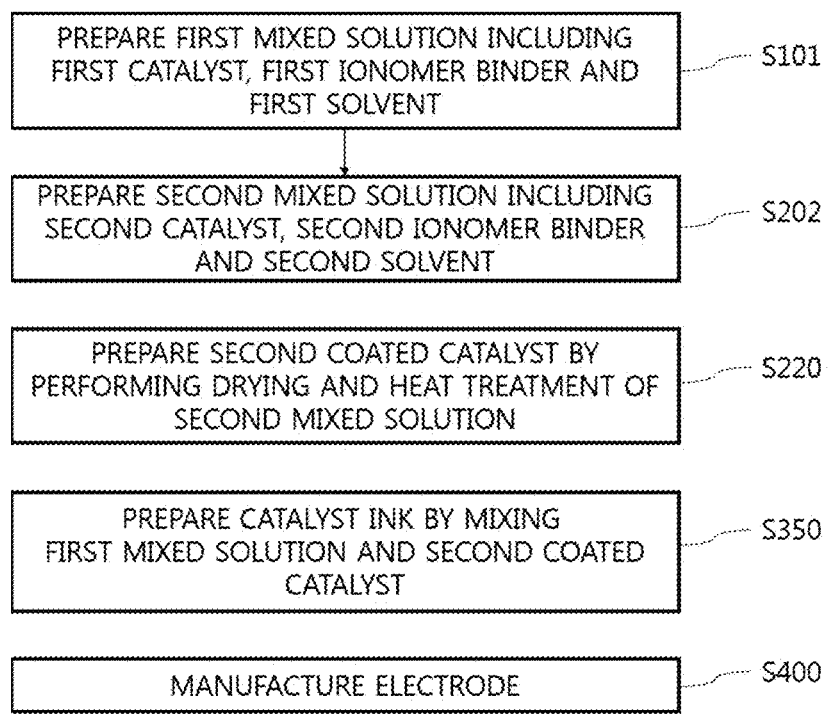
FIG. 5 is a flowchart schematically representing a method for manufacturing an electrode including a catalyst complex for fuel cells in accordance with yet another embodiment of the present disclosure.

Referring to FIG. 5, the method for manufacturing an electrode for fuel cells including a catalyst complex in accordance with this embodiment of the present disclosure may include preparing a first mixed solution including a first catalyst, a first ionomer binder, and a first solvent (operation S101), preparing a second mixed solution including a second catalyst, a second ionomer binder, and a second solvent (operation S202), preparing a second coated catalyst by performing dying and heat treatment of the second mixed solution (operation S220), preparing a catalyst ink by mixing the first mixed solution and the second coated catalyst (operation S350), and manufacturing the electrode using the catalyst ink (operation S400).

The method in accordance with this embodiment differs from the above-described methods in accordance with the former embodiments in that, in manufacture of the catalyst ink (operation S350), the catalyst ink (for example, anode) may be manufactured by mixing the first mixed solution prepared in operation S101 with the second coated catalyst prepared in operation S220. In other words, the method in accordance with this embodiment differs from the above-described methods in accordance with the former embodiments in that, in manufacture of the catalyst ink (operation S350), the catalyst ink (for example, anode) may be manufactured by mixing the first mixed solution including the first catalyst (including the hydrogen oxidation reaction catalyst), the first ionomer binder, and the first solvent with the second coated catalyst (including the water splitting catalyst) prepared by coating the second catalyst with the second ionomer binder, without performing drying and heat treatment of the first mixed solution.

Thereby, voltage reversal resistance of the fuel cell stack may be improved through a simpler process and an inexpensive method, and thus, improvement in productivity and marketability and cost reduction of the fuel cell stack may be achieved with limited resources and energy saving may be realized.

As is apparent from the above description, a catalyst complex for fuel cells and an electrode (e.g., an anode) including the same in accordance with some examples of the present disclosure may cause smooth water supply to a water splitting catalyst and thus suppress excessive voltage rise of an electrode when voltage reversal occurs.

Further, the electrode may improve voltage reversal resistance of a fuel cell stack, thereby improving driving stability of a vehicle under various driving conditions.

The electrode including the catalyst complex manufactured by a method in accordance with the present disclosure may improve voltage reversal resistance of the fuel cell stack through a simpler process and an inexpensive method, and thus achieve improvement in productivity and marketability and cost reduction of the fuel cell stack with limited resources and realize energy saving.

The disclosure has been described in detail with reference to specific embodiments. However, it should be appreciated by those having ordinary skill in the art that changes may be made in these embodiments without departing from the principles and spirit of the disclosure, the scope of which is defined in the appended claims and their equivalents.

What is claimed is:

1. A catalyst complex for fuel cells, the catalyst complex being included in an electrode for fuel cells, the catalyst complex for fuel cells comprising:
a first catalyst configured to cause hydrogen oxidation reaction; and
a second catalyst configured to cause water electrolysis reaction with the first catalyst,
wherein an outer surface of the first catalyst is coated with a first ionomer binder and an outer surface of the second catalyst is coated with a second ionomer binder,
wherein an equivalent weight (EW) of the second ionomer binder differs from an equivalent weight (EW) of the first ionomer binder,
wherein the first catalyst comprises a metal catalyst, and
wherein the second catalyst comprises a metal oxide.

2. The catalyst complex for fuel cells of claim 1, wherein the equivalent weight (EW) of the second ionomer binder is 92% or less of the equivalent weight (EW) of the first ionomer binder.

3. The catalyst complex for fuel cells of claim 1, wherein the equivalent weight (EW) of the first ionomer binder is 700 to 1200.

4. The catalyst complex for fuel cells of claim 1, wherein the first catalyst comprises a supported-type catalyst in which catalyst particles are supported on a carbon support, and
wherein the carbon support comprises one selected from a group comprising carbon black (CB), carbon nanotubes (CNTs), carbon nanofibers (CNFs), carbon nanowires (CNWs), carbon nanohorns (CNHs), graphene, and combinations thereof.

5. The catalyst complex for fuel cells of claim 1,
wherein the metal catalyst comprises one selected from a group comprising platinum (Pt), palladium (Pd), ruthenium (Ru), iridium (Ir), gold (Au), silver (Ag), chromium (Cr), manganese (Mn), iron (Fe), cobalt (Co), nickel (Ni), copper (Cu), molybdenum (Mo), yttrium (Y), and combinations thereof, and
wherein the metal oxide comprises one selected from a group comprising ruthenium (Ru), iridium (Ir), chromium (Cr), manganese (Mn), iron (Fe), cobalt (Co), nickel (Ni), copper (Cu), molybdenum (Mo), yttrium (Y), and combinations thereof.

6. The catalyst complex for fuel cells of claim 1, wherein the second catalyst comprises a supported-type catalyst in which catalyst particles are supported on a support.

7. The catalyst complex for fuel cells of claim 6, wherein the support comprises one selected from a group comprising carbon black, carbon nanotubes, carbon nanofibers, carbon nanowires, carbon nanohorns, graphene, titanium oxide, cerium oxide, niobium oxide, tungsten oxide, titanium carbide, titanium nitride, and combinations thereof.

8. The catalyst complex for fuel cells of claim 1, wherein a content of the second catalyst is 2 wt % to 80 wt % with respect to a weight of the first catalyst.

9. A method for manufacturing an electrode for fuel cells including a catalyst complex, the method comprising:
preparing a first coated catalyst by coating a first catalyst with a first ionomer binder;
preparing a second coated catalyst by coating a second catalyst with a second ionomer binder having an equivalent weight (EW) which is 92% or less of an equivalent weight (EW) of the first ionomer binder;
preparing a catalyst ink by mixing the first coated catalyst, the second coated catalyst and a solvent; and
manufacturing the electrode using the catalyst ink,
wherein the first catalyst comprises a metal catalyst, and
wherein the second catalyst comprises a metal oxide.

10. The method of claim 9, wherein, in the preparing the catalyst ink, the solvent comprises at least one of alcohol or deionized water, and
wherein the alcohol comprises one selected from a group comprising isopropyl alcohol (IPA), n-propyl alcohol (nPA), ethyl alcohol, and combinations thereof.

11. The method of claim 9, wherein the second catalyst in the catalyst ink has a content of 2 wt % to 80 wt % with respect to a weight of the first catalyst.

12. The method of claim 9, wherein the preparing the first coated catalyst comprises:
preparing a first mixed solution comprising the first catalyst, the first ionomer binder, and a first solvent; and
performing drying and heat treatment of the first mixed solution.

13. The method of claim 12, wherein the first ionomer binder in the first mixed solution has a content of 10 wt % to 50 wt % with respect to a total weight of the first catalyst and the first ionomer binder.

14. The method of claim 12, wherein, in the performing the heat treatment of the first mixed solution, the heat treatment is performed within a range of an α-transition temperature of the first ionomer binder to a temperature higher than the α-transition temperature by 100° C.

15. The method of claim 12, wherein, in the performing the heat treatment of the first mixed solution, the heat treatment is performed for 10 minutes to 10 hours.

16. The method of claim 9, wherein the preparing the second coated catalyst comprises:
preparing a second mixed solution comprising the second catalyst, the second ionomer binder, and a second solvent; and
performing drying and heat treatment of the second mixed solution.

17. The method of claim 16, wherein the second ionomer binder in the second mixed solution has a content of 5 wt % to 40 wt % with respect to a total weight of the second catalyst and the second ionomer binder.

18. The method of claim 16, wherein, in the performing the heat treatment of the second mixed solution, the heat treatment is performed within a range of an α-transition temperature of the second ionomer binder to a temperature higher than the α-transition temperature by 100° C.

19. The method of claim 16, wherein, in the performing the heat treatment of the second mixed solution, the heat treatment is performed for 10 minutes to 10 hours.

20. A method for manufacturing an electrode for fuel cells including a catalyst complex, the method comprising:
preparing a first mixed solution comprising a first catalyst, a first ionomer binder, and a first solvent;
preparing a second mixed solution comprising a second catalyst, a second ionomer binder, and a second solvent;
preparing a second coated catalyst by performing drying and heat treatment of the second mixed solution;

preparing a catalyst ink by mixing the first mixed solution and the second coated catalyst; and manufacturing the electrode using the catalyst ink, wherein the first catalyst comprises a metal catalyst, and wherein the second catalyst comprises a metal oxide.

* * * * *